United States Patent [19]
Lademann

[11] 3,736,999
[45] June 5, 1973

[54] AUTOMATIC VEHICLE COUNTING AND WEIGHING SYSTEM

[75] Inventor: Ernest E. Lademann, Park Ridge, N.J.

[73] Assignee: The Bendix Corporation, Teterboro, N.J.

[22] Filed: Sept. 30, 1971

[21] Appl. No.: 185,021

[52] U.S. Cl. .................. 177/208, 177/210, 177/254
[51] Int. Cl. ............................................. G01g 5/04
[58] Field of Search ..................... 177/25, 132, 134, 177/136, 141, 208, 209, 210, 254

[56] References Cited
UNITED STATES PATENTS

| | | |
|---|---|---|
| 3,581,836 | 6/1971 | Sergerdahl et al. ............... 177/208 X |
| 2,903,854 | 9/1959 | Harty ............................... 177/134 X |
| 3,057,422 | 10/1962 | Cunningham et al. ............. 177/210 |
| 3,446,299 | 5/1969 | Leonowicz .......................... 177/25 |

*Primary Examiner*—George H. Miller, Jr.
*Attorney*—Anthony F. Cuoco

[57] ABSTRACT

A vehicle exerts a force on a fluid in a container and which force is transmitted to a sensor supported in the container. The sensor senses the force and provides corresponding signals, and means are provided for utilizing said signals to determine predetermined vehicle parameters which are a function of the force.

2 Claims, 1 Drawing Figure

Patented June 5, 1973
3,736,999
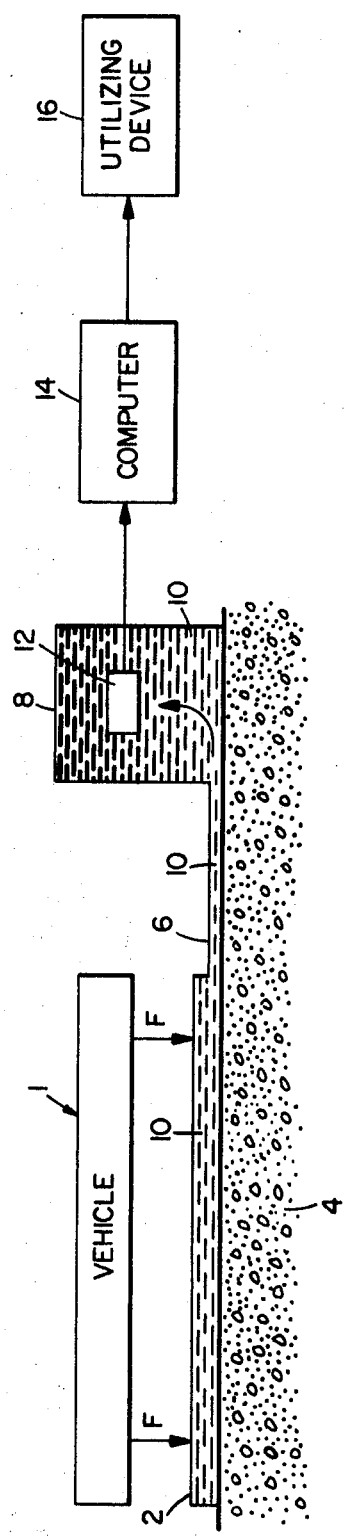

AUTOMATIC VEHICLE COUNTING AND WEIGHING SYSTEM

BACKGROUND OF THE INVENTION

1. Field of the Invention

This invention relates generally to systems for counting and/or weighing vehicles at selected highway stations. More particularly, this invention relates to systems of the type described which operate according to the principles of fluid mechanics.

2. Description of the Prior Art

Modern highway systems require means for accurately counting and/or weighing vehicles approaching toll areas or other selected areas on the highway. Strain gage apparatus has been used but has not been durable and suffers from inaccuracies. The present invention employs accurate and durable apparatus which operates on the principles of fluid mechanics to accomplish the purposes described.

SUMMARY OF THE INVENTION

This invention contemplates a system wherein a flexible hollow treadle is connected through a pipe or tube to a reservoir having a pressure sensor supported therein. The treadle, pipe and reservoir contain a fluid. Force exerted by a vehicle on the treadle deforms the treadle to exert a force on the fluid which is transmitted to the sensor. The sensor senses the force and provides corresponding electrical signals. A computer is responsive to the signals for computing the vehicle weight or number of axles as the case may be, and a utilizing device such as an indicator is responsive to the computer output for indicating the desired parameter.

One object of this invention is to provide an automatic vehicle counting and/or weighing system which is more accurate and more durable than systems of the type now known in the art.

Another object of this invention is to provide a system of the type described which operates according to the principles of fluid mechanics.

Another object of this invention is to weigh and/or count vehicles by measuring the force exerted by the vehicles on a fluid.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWINGS

The single FIGURE in the drawing is a schematic diagram of a system constructed according to the invention.

DESCRIPTION OF THE INVENTION

A flexible treadle 2 is suitably mounted in a road surface 4 which may be of concrete as shown in the FIGURE, or of any other material suitable for the purposes intended. Treadle 2 may be a hollow container of a thin gage steel having structural characteristics sufficient to withstand destruction by a force F exerted by a vehicle 1, but yet be flexible enough so as to deform under said force. Treadle 2 is connected by a pipe 6 to a reservoir 8. A fluid 10, which may be, a suitable gas or a liquid substance such as used in automobile braking systems is contained within the treadle, pipe and reservoir. A pressure sensor 12, which may be of a type well known in the art and suitable for the purposes described is supported within reservoir 8. Sensor 12 senses force F which is transmitted by the fluid as will be hereinafter explained and provides corresponding electrical signals.

Sensor 12 may thus be a device such as described in U. S. Pat. No. 3,482,197 issued to Kondo et al on Dec. 2, 1969.

A computer 14 is connected to pressure sensor 12 and is responsive to the electrical signals therefrom for computing the weight of the vehicle, the number of axles the vehicle may have, or any other desired vehicle parameter which is a function of force F. To this end computer 14 may be a device marketed by the Bendix Corporation as the BDX-6200 General Purpose Computer and described in Publication No. 716-15 published by the Navigation & Control Division of the Bendix Corporation, Teterboro, N.J. A utilizing device 16, which may be, for purposes of illustration, a conventional type indicator such as described in the aforenoted U. S. Pat. No. 3,482,197, is connected to computer 14 for indicating the parameters or otherwise utilizing the signals therefrom.

Treadle 2 may be mounted at a toll station, a weighing station or any other suitable section of a highway. As vehicle 1 passes over treadle 2 the treadle is deformed and force F is transmitted to fluid 10. If fluid 10 is a liquid, it is incompressible and Pascal's Principle applies which states that an increase in pressure on any part of a confined liquid causes an equal increase throughout the liquid. If fluid 10 is a gas, it is compressed by force F and exerts a pressure in accordance with Boyle's Law which states that the volume of a confined gas varies inversely as pressure. In either event force F acting on the liquid is sensed by sensor 12 which provides electrical signals corresponding to the sensed force. The signals are processed by computer 14 and the processed signals are used by device 16 as heretofore noted.

It will be seen from the aforenoted description of the invention that the objects heretofore set forth have been met.

An accurate and reliable system has been provided which operates on the principles of fluid mechanics. The number of moving parts in the device is at a minimum to increase durability and accuracy.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for performing vehicle weighing and counting functions, comprising:
   a hollow deformable treadle supported at a selected point in a roadway;
   a reservoir;
   a sensor supported within the reservoir;
   a pipe connecting the treadle and reservoir;
   a fluid contained within the treadle, pipe and reservoir;

a force exerted by the vehicle as it passes over the treadle causing said treadle to deform and exert a force on the fluid;

said force being transmitted by the fluid to the sensor which provides corresponding signals; and means connected to the sensor and responsive to the signals therefrom for effecting at least one of the weighing and counting functions.

2. Apparatus as described by claim 1, wherein the last mentioned means includes:

a computer responsive to the sensor signals for computing the one function; and an indicator connected to the computer for indicating the computed function.

* * * * *